United States Patent [19]

Kukes et al.

[11] Patent Number: 4,588,706

[45] Date of Patent: May 13, 1986

[54] PHOSPHORUS CONTAINING HYDROFINING CATALYSTS

[75] Inventors: Simon G. Kukes; Stephen L. Parrott, both of Bartlesville, Okla.

[73] Assignee: Phillips Petroleum Company, Bartlesville, Okla.

[21] Appl. No.: 748,112

[22] Filed: Jun. 24, 1985

[51] Int. Cl.[4] .................................. B01J 27/19
[52] U.S. Cl. .......................... 502/211; 502/210; 502/219; 502/220; 502/221; 502/313; 502/315; 502/321; 208/216 R; 208/243; 208/244; 208/254 H; 208/295
[58] Field of Search ............. 502/211, 210, 219, 220, 502/221, 222, 313, 315, 316, 321

[56] References Cited

U.S. PATENT DOCUMENTS

| | | | |
|---|---|---|---|
| 3,232,887 | 2/1966 | Pessimisis | 252/435 |
| 3,609,099 | 9/1971 | Mickelson | 252/435 |
| 3,706,693 | 12/1972 | Mickelson et al. | 252/435 |
| 3,755,148 | 8/1973 | Mickelson | 502/211 |
| 3,755,196 | 8/1973 | Mickelson | 502/211 |
| 3,904,550 | 9/1975 | Pine | 252/437 |
| 3,965,041 | 6/1976 | van Klinken et al. | 502/211 |
| 4,251,350 | 2/1981 | Johnson et al. | 208/216 R |
| 4,392,985 | 7/1983 | Millman | 502/211 |
| 4,513,097 | 4/1985 | Angmorter et al. | 502/211 |

*Primary Examiner*—John Doll
*Assistant Examiner*—A. Pal
*Attorney, Agent, or Firm*—K. K. Brandes

[57] ABSTRACT

A catalyst composition is prepared by dissolving a suitable oxygen containing compound of a Group VIB metal (preferably Mo), a suitable compound of a Group VIII metal (preferably Ni) and phosphorous acid in water, mixing this solution with an alumina containing support material, and calcining this mixture. This catalyst composition is used primarily for hydrotreating of hydrocarbon feed stream, which contain nitrogen and sulfur impurities, particularly heavy cycle oils.

16 Claims, No Drawings

PHOSPHORUS CONTAINING HYDROFINING CATALYSTS

BACKGROUND OF THE INVENTION

In one aspect, this invention relates to a process for preparing a promoted, alumina-based catalyst composition. In another aspect, this invention relates to catalytic hydrotreating of liquid hydrocarbon containing feed streams, in particular petroleum fractions.

The use of alumina, promoted with transition metal and phosphorus compounds, for hydrotreating (e.g., demetallizing, desulfurizing, denitrogenating, hydrocracking) liquid hydrocarbon feed streams, which contain coke precursors and metal, sulfur and nitrogen impurities, is well known. However, there is an ever present need to develop new methods of preparing such catalysts and to develop new catalysts that are more effective in removing undesirable impurities from such feed streams.

SUMMARY OF THE INVENTION

It is an object of this invention to provide an effective hydrofining catalyst composition. It is another object of this invention to provide a process for preparing a new, effective hydrofining catalyst composition. It is a further object of this invention to provide a new impregnating solution, to be used primarily for the preparation of catalyst compositions. It is a still further object of this invention to employ a new catalyst for the removal of nitrogen and other impurities from hydrocarbon-containing oils. Other objects and advantages will be apparent from the detailed description and the appended claims.

In accordance with this invention, a composition of matter (suitable as a catalyst composition) is prepared by a process comprising the steps of:

(A) mixing (a) at least one oxygen containing compound of a metal belonging to Group VIB of the Periodic Table (as defined in "College Chemistry" by Nebergall et al; D. C. Heath and Company, 1972), (b) at least one compound of a Group VIII metal selected from the group consisting of iron, cobalt and nickel, (c) phosphorous acid containing material and (d) water, in such amounts and under such conditions as to provide a solution;

(B) mixing the solution obtained in step (A) with an alumina-containing support material;

(C) heating the mixture obtained in step (B) at a first temperature under such conditions as to at least partially dry said mixture; and (D) heating (calcining) the at least partially dried mixture obtained in step (C) at a second temperature, which is higher than said first temperature, under such conditions as to activate said mixture.

In a preferred embodiment of this invention, the Group VIB metal is molybdenum, the Group VIII metal is nickel, and the calcining step is carried out in an inert gas (preferably at least one of $N_2$, He, Ne, Ar, Kr, Xe). In another embodiment, the process of this invention comprises a presulfiding step (F) after step (D).

In still another embodiment of this invention, an aqueous solution as prepared by step (A) is provided. This solution is preferably used for impregnating substantially inert support materials so as to prepare catalyst compositions.

In a further embodiment, the composition of matter prepared by the process of this invention comprising steps (A), (B), (C) and (D) is contacted with a hydrogen containing gas and a substantially liquid hydrocarbon containing feed stream, which also contains compounds of sulfur and nitrogen (as impurities), under such conditions as to produce a hydrocarbon stream having a reduced level of sulfur and nitrogen impurities.

DETAILED DESCRIPTION OF THE INVENTION

The preferred compound (a) which contains molybdenum and oxygen is more preferably selected from the group consisting of molybdenum oxides and hydroxides, molybdenum blue, ammonium and alkali metal orthomolybdates, ammonium and alkali metal dimolybdates, ammonium and alkali metal heptamolybdates, ammonium and alkali metal isomolybdates, phosphomolybdic acid and ammonium salts thereof. The presently most preferred molybdenum-oxygen compound is $MoO_3$.

The preferred nickel containing compound (b) is more preferably selected from the group consisting of nickel(II) oxide, nickel(II) hydroxide, nickel(II) carbonate, basic nickel(II) carbonate ($Ni_2(OH)_2CO_3$), nickel(II) hydrogen carbonate, nickel(II) nitrate, nickel(II) sulfate, nickel(II) halides, nickel(II) formate, nickel(II) acetate, nickel(II) oxalate, nickel(II) carboxylates having 3–12 carbon atoms per molecule and nickel acetylacetonate. Presently most preferred is $NiCO_3$.

The phosphorous acid containing material (c) can be substantially anhydrous $H_3PO_3$ (presently most preferred), or as aqueous solutions of $H_3PO_3$ or $H_4P_2O_5$ (diphosphorous acid), or as acidified aqueous solutions of ammonium phosphites or alkali metal phosphites. Furthermore, it is within the scope of this invention to generate $H_3PO_3$ in-situ such as by reaction of $P_2O_3$ with water, or by hydrolysis of phosphorus trihalides (e.g., $PCl_3$), or by hydrolysis of esters of the formulas $P(OR)_3$ or $OPH(OR)_2$, wherein each R is individually selected from the group consisting of alkyl, cycloalkyl, alkylcycloalkyl, aryl, alkaryl and cycloalkaryl radicals having from 1 to 20 carbon atoms. In one embodiment of this invention, a mixture of phosphorous acid and phosphoric acid is employed as component (c) in step (A). This $H_3PO_3/H_3PO_4$ mixture can contain from about 1 to about 99 mole-% $H_3PO_3$, preferably from about 20 to about 99 mole-% $H_3PO_3$. The advantage of using a mixture of $H_3PO_3$ and $H_3PO_4$ is that generally $H_3PO_4$ is less expensive and more readily available than $H_3PO_3$.

It is presently preferred to carry out step (A) under such conditions and using such amounts of (a), (b), (c) and (d) as to obtain a substantially clear solution. It is presently believed that this solution comprises divalent nickel (i.e., $Ni^{+2}$) cations, molybdenum and oxygen containing anions and phosphite anions. However, it is within the scope of this invention to obtain in step (A) a solution having solid particles dispersed therein. In this case, the solution with solids dispersed therein can be used as is in step (B), or preferably, the dispersed solid particles are separated from the solution by any suitable separation means such as filtration, centrifugation or settling and subsequent draining before step (B).

The solution obtained in step (A) preferably contains the following concentrations of Group VIB metal, Group VIII metal and phosphorus, given in the number of gram-atomic weights (herein referred to as mole) per liter solution.

|  | Broad | Intermediate | Narrow |
| --- | --- | --- | --- |
| Mole/l of Group VIB Metal | 0.01–10.0 | 0.1–5.0 | 0.5–3.0 |
| Mole/l of Group VIII Metal | 0.01–5.0 | 0.05–3.0 | 0.2–1.5 |
| Mole/l of Phosphorus | 0.01–5.0 | 0.05–2.0 | 0.2–1.0 |

In one embodiment of this invention, the aqueous solution obtained in step (A) is provided and used as is for purposes other than preparing alumina-supported catalysts. For instance, the solution can be used for impregnating other substantially inert support materials such as silica, alumino-silicates (e.g., zeolites), titania, metal phosphates and the like, so as to make a variety of catalysts, preferably for hydrogenation and hydrocracking reactions. However, it is within the scope of this invention to use this solution for purposes other than catalyst preparation. Solid particles dispersed in the solution can be removed by the above-described separation means.

The alumina-containing support material employed in step (B) can be substantially pure alumina or partially hydrated forms thereof. Generally the surface area (determined by BET/$N_2$; ASTM D3037) of said support material ranges from about 20 to about 350 m$^2$/g. The support material may contain transition metals (e.g., Mo) or compounds thereof, usually at a level of less than 1 weight-%, based on the weight of the entire alumina-containing material (before impregnation step (A)). It is within the scope of this invention to employ mixtures of alumina and other inorganic refractory materials such as silica, alumino-silicates (zeolites), magnesia, titania, zirconia, aluminum phosphate, zirconium phosphate, alumina-titania, zeolite-alumina, zeolite-silica and the like. If a phosphate is present, the amount is generally less than 10 weight-% P, based on the weight of the alumina-containing support material (before impregnation step (A)).

The drying step (C) is generally carried out in air or an inert gas, at a temperature ranging from about 25° C. to about 200° C. (preferably 50°–100° C.) so as to remove the greatest portion of water from the mixture obtained in step (B). Vacuum conditions may be employed but are presently not preferred. The at least partially dried mixture generally contains less that about 20 weight-% water. The rate of drying is controlled so as to avoid surges of water vapor that can cause the impregnating solution to splatter and to excessively accumulate in certain surface regions of the solid support material. Depending on the drying temperature and specific drying conditions (such as extent of air movement, thickness of the solid layer to be dried), the drying time ranges generally from about 0.5 hour to about 100 hours, preferably from about 1 hour to about 30 hours.

It is presently believed that the activation occurring in heating (calcining) step (D) is the result of an at least partial conversion of the compounds used in step (A) to oxidic compounds of Group VIB and VIII metals and phosphites of Group VIII metals. The terms "activate" and "activation" as used herein mean that the calcined catalyst composition of this invention is a more effective catalyst for hydrotreating reactions, particularly hydrodesulfurization and hydrodenitrogenation of liquid hydrocarbon containing feed streams, than the at least partially dried mixture obtained in step (C).

Preferred heating (calcining) conditions in step (D) comprise heating in a non-reducing gas atmosphere at a temperature ranging from about 200° C. to about 600° C. (more preferably 300°–600° C.), and a heating time ranging from about 0.2 to about 10 hours. A presently more preferred specific calcining program is described in Example I. The heating can be carried out in a free oxygen containing atmosphere, such as air. But more preferably, the heating step is carried out in an inert gas atmosphere, e.g., nitrogen, helium, neon, argon, krypton, xenon, or mixtures thereof, most preferably in $N_2$.

Preferred calcined compositions of matter of this invention generally contain from about 0.2 to about 20, preferably from about 6.0 to about 15, weight-% Mo, based on the weight of the entire catalyst composition; from about 0.2 to about 10, preferably from about 2.0 to about 6.0, weight-% Ni, based on the weight of the entire catalyst composition; and from about 0.2 to about 10, preferably from about 0.5 to about 3.0, weight-% P, based on the weight of the entire catalyst composition. The surface area (determined by the BET/$N_2$ method; ASTM D3037) of the calcined catalyst composition of this invention ranges from about 20 to about 350 m$^2$/g, preferably from about 100 to about 250 m$^2$/g. The catalyst composition can be pelletized or compacted into various shaped (e.g., spherical, cylindrical or trilobal) for convenient shipping and use in fixed catalyst beds.

In one embodiment, the calcined catalyst composition of this invention is presulfided by the additional step (F) of contacting the calcined catalyst composition with a suitable sulfur compound under such conditions as to at least partially convert the transition metal compounds contained in the calcined catalyst composition to sulfides. This can be accomplished by passing a sulfur-containing gas oil or a solution of COS or mercaptans or organic sulfides, e.g., in a hydrocarbon solvent, over the catalyst composition at an elevated temperature (e.g., at 300°–650° F.), generally in the presence of hydrogen gas. Or a gaseous mixture of hydrogen and hydrogen sulfide (e.g. at a volume ratio of about 10:1) can be passed over the catalyst composition at an elevated temperature, preferably 1–15 hours at about 400° F. and then 1–15 hours at about 700° F. This presulfiding step is particularly desirable when the catalyst composition of this invention is used for hydrotreating or hydrocracking of liquid hydrocarbon containing feed streams.

The compositions of matter of this invention can be used as catalyst compositions for a variety of hydrocarbon treating and conversion reactions. In one preferred embodiment of this invention, the catalyst composition of this invention is used as a catalyst for hydrotreating substantially liquid hydrocarbon containing feed streams, which also contain compounds of nitrogen and of sulfur as impurities. Metals (primarily nickel and vanadium) and coke precursors are generally also present in these hydrocarbon feed streams. Suitable hydrocarbon containing feed streams include crude oil and fractions thereof, petroleum products, heavy oil extracts, coal pyrolyzates, liquefied coal products, products from tar sands, shale oil and shale oil products. The catalyst compositions are particularly suited for treating petroleum fractions such as cycle oils (preferably heavy cycle oils), which generally boil (under a pressure of 1 atm) at a temperature of about 300°–800° F., preferably about 350°–700° F., contain about 0.02–2 weight-% nitrogen and about 0.1–5 weight-% sulfur, and have an API$^{60}$ gravity (measured at 60° F.) of about 10–30.

Some of these feed streams also contain metals, e.g., 5-500 ppmw (parts per million by weight) of vanadium and 3-300 ppmw of nickel.

The hydrotreating process employing the catalyst composition of this invention can be carried out in any apparatus whereby an intimate contact of the catalyzed composition with hydrogen gas and the hydrocarbon containing feed stream is achieved, under such conditions as to produce a hydrocarbon containing product having a reduced level of nitrogen and sulfur. Generally, lower levels of metals and Ramsbottom carbon residue and a higher value of $API^{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrocarbon hydrotreating process can be carried out as a batch process or, preferably, as a continuous process.

The catalyst composition of this invention can be used in said hydrocarbon hydrotreating process alone in a reactor or may be used in combination with essentially inert materials such as alumina, silica, titania, magnesia, silicates, metal aluminates, alumino-silicates (e.g., zeolites), titania and metal phosphates. Alternating layers of the inert material and of the catalyst composition can be used, or the catalyst composition can be mixed with the inert material. Use of the inert material with the catalyst composition provides for better dispersion of the hydrocarbon containing feed stream. Also, other catalysts such as known hydrogenation and hydrotreating catalysts (e.g., $CoO/MoO_3$, $NiO/MoO_3$ or $CoO/NiO/MoO_3$ on alumina) may be used with the catalyst composition of this invention to achieve simultaneous demetallization, desulfurization, denitrogenation, hydrogenation and hydrocracking, if desired. In one embodiment of said hydrotreating process, the catalyst composition of this invention has been presulfided as described above before being used.

Any suitable reaction time between the catalyst composition and the hydrocarbon containing feed stream and hydrogen gas can be utilized. In general, the reaction time will range from about 0.05 hours to about 10 hours. Preferably, the reaction time will range from about 0.25 to about 5 hours. Thus, the flow rate of the hydrocarbon containing feed stream should be such that the time required for the passage of the mixture through the reactor (residence time) will preferably be in the range of about 0.25 to about 5 hours. In a continuous fixed bed operation, this generally requires a liquid hourly space velocity (LHSV) in the range of about 0.10 to about 20 cc of feed per cc of catalyst per hour, preferably from about 0.2 to about 4.0 cc/cc/hr.

The hydrotreating process employing the catalyst composition of the present invention can be carried out at any suitable temperature. The reaction temperature will generally be in the range of about 250° C. to about 550° C. and will preferably be in the range of about 300° C. to about 450° C. Higher temperatures do improve the removal of nitrogen and other impurities, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds such as light cycle oils.

Any suitable pressure may be utilized in the hydrotreating process. The reaction pressure will generally be in the range of about atmospheric pressure (0 psig) to up to about 5,000 psig. Preferably, the pressure will be in the range of about 100 to about 2500 psig. Higher pressures tend to reduce coke formation but operation at high pressure may have adverse economic consequences.

Any suitable quantity of hydrogen gas can be added to the hydrotreating process. The quantity of hydrogen gas used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized primarily for denitrogenation and desulfurization until a satisfactory level of nitrogen and sulfur removal is no longer achieved which generally results from the coating of the catalyst composition with coke and possibly metals being removed from the feed. It is generally contemplated that once the removal of nitrogen and sulfur falls below a desired level, the used (deactivated) catalyst will simply be replaced by a fresh catalyst.

Generally, at least a portion of the hydrotreated product stream having reduced nitrogen and sulfur contents is subsequently cracked in a cracking reactor, e.g. in a fluidized catalytic cracking unit using a zeolite catalyst, under such conditions as to produce lower boiling hydrocarbon materials suitable for use as gasoline, diesel fuel, lubricating oils and other useful products. It is within the scope of this invention to hydrotreat said product stream having reduced nitrogen and sulfur contents in one or more processes using different catalyst compositions, such as alumina-supported $NiO/MoO_3$ catalysts, for further removal of sulfur and other impurities, before the product stream is introduced into the cracking reactor. It is also within the scope of this invention, to pass the hydrocarbon feed stream with hydrogen gas through a guard bed, filled with a suitable demetallizing material such as alumina (with or without promoter metal), so as to remove metals from the feed before it is hydrotreated with the catalyst composition of this invention. It is also within the scope of this invention to have decomposable transition metal compounds such as molybdenum hexacarbonyl, molybdenum dithiophosphate and molybdenum dithiocarbamate present in any of the above-mentioned hydrotreating processes.

The following examples are presented in further illustration of the invention and are not to be considered as unduly limiting the scope of this invention.

EXAMPLE I

This example illustrates the preparation of several alumina-supported hydrofining catalysts.

Catalyst A (Invention):

9.0 grams of $H_3PO_3$ (Alfa Products, Danvers, MA; Catalog No. 89407; Lot 050884) and 51.0 grams of $MoO_3$ (Mallinckrodt, Inc.; St. Louis, MO; Catalog No. 2684; Lot KJMZ) were mixed with 150 mL of distilled water and heated under reflux overnight. To the essentially clear, blue solution was slowly added 16.4 grams of $NiCO_3$ (Fisher Scientific Company; Catalog No. N-51; Lot 705165). The solution was refluxed for about 30 minutes. Then a portion of water was slowly evaporated. The final weight of the solution was 172.4 grams;

it contained about 0.197 g Mo/g solution; 0.047 g Ni/g solution and 0.020 g P/g solution.

About 51.5 grams of the above prepared solution was diluted with water to 45 mL and was then slowly added through a funnel with stopcock to about 60 grams of alumina (BET/$N_2$ surface area: 250; $m^2$/gm mercury pore volume: 0.75 cc/gm) in an evacuated Erlenmeyer flask. The mixture was shaken under vacuum for several minutes. Then the flask was filled with air the mixture was removed and dried in air under a heat lamp. The dried catalyst composition was calcined under flowing nitrogen at 400° F. for 30 minutes and then at 800° F. for 3 hours. The calcined Catalyst A contained 3.0 weight-% Ni, 12.6 weight-% Mo and 1.26 weight-% P.

Catalyst B (Control):

Catalyst B was prepared essentially in accordance with the procedure described for Catalyst A, except that 12.6 grams of 85% $H_3PO_4$ (in lieu of $H_3PO_3$) and only 100 mL of water were used to make the impregnating solution. The calcined Catalyst B contained the about same amounts of Mo, Ni and P as Catalyst A. Also the surface area and pore volume were substantially equal to that of Catalyst A.

Catalyst C (Invention):

This catalyst was prepared essentially in accordance with the procedure described for Catalyst A, except that a mixture of 3.0 grams of $H_3PO_3$ and 8.4 grams of 85% $H_3PO_4$ was used (in lieu of only $H_3PO_3$). Levels of Ni, Mo and P, surface area and pore volume of catalyst were essentially identical to those of Catalyst A.

Catalyst D Invention:

This catalyst was prepared in accordance with the procedure described for Catalyst A, except that the catalyst was calcined in air (rather than $N_2$) according to the following schedule: 100° F.→400° F. within 30 minutes; 2 hours at 400° F.; 400° F.→500° F. within 30 minutes; 1 hour at 500° F.; 500° F.→800° F. within 30 minutes; 3 hours at 800° F.; 800° F.→room temperature within 2-3 hours.

Catalyst E (Control):

This catalyst was prepared in accordance with the procedure for Catalyst B, except that the catalyst was calcined in air according to the same schedule as used for Catalyst D.

Catalysts A-E were presulfided before use as follows. A heated tube reactor was filled with a 2½ inch high bottom layer of Alundum (α-alumina having a surface area of less than 1 $m^2$/g), an 11 inch high middle layer of a 70 cc mixture containing 12.5 cc of the catalyst and the balance 36 grit Alundum, and a 5 inch top layer of Alundum. The reactor was purged with nitrogen and the catalyst was heated for one hour in a hydrogen stream to about 400° F., the catalyst was exposed to a mixture of nitrogen (10 1/hr), hydrogen (10 1/hr) and hydrogen sulfide (1.4 1/hr) for about 14 hours. The catalyst was then heated for about one hour in the mixture of hydrogen and hydrogen sulfide to a temperature of about 700° F. for about 14 hours while the catalyst continued to be exposed to the mixture of hydrogen and hydrogen sulfide. The catalyst was then allowed to cool to ambient temperature conditions in the mixture of hydrogen and hydrogen sulfide and was finally purged with nitrogen.

EXAMPLE II

This example illustrates the use of Catalysts A-E in tests for hydrotreating a light cycle oil (LCO) which had an $API^{60}$ gravity of 21.4, and contained 4.19 weight-% of added benzothiophene and 4.61 weight-% of added quinoline so as to provide a concentration of about 1.5 weight-% sulfur and about 0.55 weight-% (5500 ppm) nitrogen. A trickle bed reactor was filled with a mixture of 9.1 grams (12.5 cc) of one of the catalysts (A-E) and enough 20/40 mesh Alundum having a surface area of less than 1 $m^2$/g; marketed by Norton Chemical Process Products, Akron, OH) to make a total volume of 70 cc. Hydrogen was introduced into the reactor through a tube that concentrically surrounded the oil induction tube but extended only as far as the reactor top. The reactor was heated with a Thermcraft (Winston-Salem, NC) Model 211 3-zone furnace. The reactor temperature was measured in the catalyst bed at three different locations by three separate thermocouples embedded in an axial thermocouple well (0.25 inch outer diameter). The liquid product oil was generally collected every day for analysis. The hydrogen gas was vented. Sulfur content was measured by X-ray fluorescence spectrometry and N content was measured in accordance with ASTM D3228.

Process conditions were essentially the same for all tests: a temperature of 600°-650° F., a liquid hourly space velocity (LHSV) of about 2.0 cc/cc catalyst/hour, a pressure of 800 psig, and a hydrogen flow of 4000 standard cubic feet per barrel. Pertinent product parameters are summarized in Table I.

TABLE I

| Run | Temp. (°F.) | Catalyst | ppm N in Product | Wt % S in Product | $API^{60}$ of Product |
| --- | --- | --- | --- | --- | --- |
| Feed | — | — | 5,500 | 1.5 | 21.4 |
| 1 (Invention) | 650 | $A^1$ | 219 | 0.08 | 28.7 |
| 2 (Invention) | 650 | $D^2$ | 352 | 0.12 | 28.4 |
| 3 (Control) | 650 | $B^1$ | 453 | 0.12 | 28.4 |
| 4 (Control) | 650 | $E^2$ | 449 | 0.13 | 28.4 |
| 5 (Invention) | 650 | $C^1$ | 280 | 0.11 | 28.4 |
| 6 (Invention) | 600 | $A^1$ | 1630 | 0.20 | 27.1 |
| 7 (Control) | 600 | $B^1$ | 2130 | 0.21 | 26.7 |

[1]Calcined in nitrogen.
[2]Calcined in air.

Data in Table I clearly show the superiority, in terms of nitrogen removal, of catalysts prepared with phosphorous acid ($H_3PO_3$) in the impregnating solution (Catalysts A, C, D) over those prepared with phosphoric acid ($H_3PO_4$) in the impregnating solution (Catalysts B and E). Furthermore, invention Catalyst A, which was calcined in nitrogen, was more effective in removing nitrogen from the oil than Catalyst D, which was calcined in air (compare runs 1 and 2). This result was quite surprising since no such difference was observed for control Catalysts B (calcined in $N_2$) and E (calcined in air) (compare runs 3 and 4). Based on these results, it is preferred to calcine the invention catalysts in an inert, non-oxidizing atmosphere (such as $N_2$, He, Ar, and the like). Surprisingly, Catalyst C (prepared with a 1:2 mixture of $H_3PO_3$ and $H_3PO_4$) was almost as effective in removing nitrogen as Catalyst A (prepared with $H_3PO_3$ only) and considerably more effective than Catalyst B (prepared with $H_3PO_4$ only).

Reasonable variations and modifications are possible within the scope of the disclosure and the appended claims.

We claim:

1. A process for preparing a composition of matter comprising the steps of:
   (A) mixing (a) at least one oxygen containing compound of a metal belonging to Group VIB of the Periodic Table, (b) at least one compound of a Group VIII metal selected from the group consisting of iron, cobalt and nickel, (c) phosphorous acid containing material, and (d) water, in such amounts and under such conditions as to obtain a solution;
   (B) mixing the solution obtaining in step (A) with an alumina-containing support material;
   (C) heating the mixture obtained in step (B) at a first temperature under such conditions as to at least partially dry said mixture; and
   (D) heating the at least partially dried mixture obtained in step (C) in an inert, non-oxidizing and non-reducing atmosphere at a second temperature, which is higher than said first temperature, under such conditions as to activate said mixture.

2. A process in accordance with claim 1, wherein said Group VIB metal is molybdenum, said group VIII metal is nickel, and said heating in step (D) is carried out in an inert gas selected from the group consisting of $N_2$, He, Ne, Ar, Kr and Xe.

3. A process in accordance with claim 2, wherein said oxygen containing compound of molybdenum is selected from the group consisting of molybdenum oxides and hydroxides, molybdenum blue, ammonium and alkali metal orthomolybdates, ammonium and alkali metal dimolybdates, ammonium and alkali metal heptamolybdates, ammonium and alkali metal isomolybdates, phosphomolybdic acid and ammonium salts thereof; and said compound of nickel is selected from the group consisting of nickel(II) oxide, nickel(II) hydroxide, nickel(II) carbonate, nickel(II) bicarbonate, basic nickel(II) carbonate, nickel(II) nitrate, nickel(II) sulfate, nickel(II) halides, nickel(II) acetate, nickel(II) formate, nickel(II) oxalate, nickel(II) carboxylates containing from 3-12 carbon atoms and nickel acetylacetonate.

4. A process in accordance with claim 2, wherein said solution obtained in step (A) comprise about 0.01-10.0 mole/l Mo, about 0.01-5.0 mole/l Ni and about 0.01-5.0 mole/l P.

5. A process in accordance with claim 3, wherein said oxygen containing compound of molybdenum is $MoO_3$, said compound of nickel is $NiCO_3$, and said phosphorous acid containing material is selected from the group consisting of $H_3PO_3$ and mixtures of $H_3PO_3$ and $H_3PO_4$.

6. A process in accordance with claim 5, wherein said solution obtained in step (A) comprises about 0.1-5.0 mole/l Mo, about 0.05.3.0 mole/l Ni and about 0.05-2.0 mole/l P.

7. A process in accordance with claim 1, wherein said heating conditions in step (C) comprise a temperature ranging from about 25° C. to about 200° C. and said heating in step (D) is carried out at a temperature ranging from about 200° C. to about 600° C.

8. A process in accordance with claim 1, wherein said alumina-containing support has a surface area ranging from about 20 $m^2$/g to about 350 $m^2$/g.

9. A composition of matter, suitable as a catalyst composition, having been prepared by a process comprising the steps of:
   (A) mixing (a) at least one oxygen containing compound of a metal belonging to Group VIB of the Periodic Table, (b) at least one compound of a Group VIII metal selected from the group consisting of iron, cobalt and nickel, (c) phosphorous acid containing material, and (d) water, in such amounts and under such conditions as to obtain a solution;
   (B) mixing the solution obtained in step (A) with an alumina-containing support material;
   (C) heating the mixture obtained in step (B) at a first temperature under such conditions as to at least partially dry said mixture; and
   (D) heating the at least partially dried mixture obtained in step (C) in an inert, non-oxidizing and non-reducing atmosphere at a second temperature, which is higher than said first temperature, under such conditions as to activate said mixture.

10. A composition of matter in accordance with claim 9 wherein said Group VIB metal is molybdenum, said group VIII metal is nickel, and said heating in step (D) is carried out in an inert gas selected from the group consisting of $N_2$, He, Ne, Ar, Kr and Xe.

11. A composition of matter in accordance with claim 10, wherein said oxygen containing compound of molybdenum is selected from the group consisting of molybdenum oxides and hydroxides, molybdenum blue, ammonium and alkali metal orthomolybdates, ammonium and alkali metal dimolybdates, ammonium and alkali metal heptamolybdates, ammonium and alkali metal isomolybdates, phosphomolybdic acid and ammonium salts thereof; and said compound of nickel is selected from the group consisting of nickel(II) oxide, nickel(II) hydroxide, nickel(II) carbonate, nickel(II) bicarbonate, basic nickel(II) carbonate, nickel(II) nitrate, nickel(II) sulfate, nickel(II) halides, nickel(II) acetate, nickel(II) formate, nickel(II) oxalate, nickel(II) carboxylates containing from 3-12 carbon atoms and nickel acetylacetonate.

12. A composition of matter in accordance with claim 10, wherein the solution obtained in step (A) comprises about 0.01-10.0 mole/l Mo, about 0.01-5.0 mole/l Ni, and about 0.01-5.0 mole/l P.

13. A composition of matter in accordance with claim 11, wherein said oxygen containing compound of molybdenum is $MoO_3$, said nickel compound is $NiCO_3$, and said phosphorous acid containing material is selected from the group consisting of $H_3PO_3$ and mixtures of $H_3PO_3$ and $H_3PO_4$.

14. A composition of matter in accordance with claim 9, wherein said heating conditions in step (C) comprise a temperature ranging from about 25° C. to about 200° C. and said heating in step (D) is carried out at a temperature ranging from about 200° C. to about 600° C.

15. A composition of matter in accordance with claim 9 comprising from about 0.2 to about 20 weight-% Mo, based on the weight of the entire catalyst composition; from about 0.2 to about 10 weight-% Ni, based on the weight of the entire catalyst composition; from about 0.2 to about 10 weight-% P, based on the weight of the entire catalyst composition; and having a surface area ranging from about 20 $m^2$/g to about 350 $m^2$/g.

16. A composition of matter in accordance with claim 9 comprising from about 6.0 to about 15 weight-% Mo, based on the weight of the entire catalyst composition; from about 2.0 to about 6.0 weight-% Ni, based on the weight of the entire catalyst composition; from about 0.5 to about 3.0 weight-% P, based on the weight of the entire catalyst composition; and having a surface area ranging from about 100 $m^2$/g to about 250 $m^2$/g.

* * * * *